United States Patent
Wu

(10) Patent No.: US 6,827,366 B1
(45) Date of Patent: Dec. 7, 2004

(54) ADJUSTMENT MECHANISM FOR A HANDLE OF A FOLDING GOLF CART

(75) Inventor: Fang-Li Wu, Tainan (TW)

(73) Assignee: Sports World Enterprise Co., Ltd., Tainan Hsien (TW)

( * ) Notice: Subject to any disclaimer, the term of this patent is extended or adjusted under 35 U.S.C. 154(b) by 0 days.

(21) Appl. No.: 10/683,431

(22) Filed: Oct. 14, 2003

(51) Int. Cl.[7] ................................................. B62B 3/02
(52) U.S. Cl. ..................... 280/651; 280/654; 280/639; 280/47.371; 280/DIG. 6
(58) Field of Search ................................ 280/651, 639, 280/654, 642, 655.1, 47.41, 47.34, 62, 47.18, DIG. 6, 47.371

(56) References Cited

U.S. PATENT DOCUMENTS

| | | | | | |
|---|---|---|---|---|---|
| 3,043,602 A | * | 7/1962 | Goodhall | ..................... | 280/38 |
| 3,561,555 A | * | 2/1971 | Carmichael | ................. | 180/11 |
| 3,867,993 A | * | 2/1975 | Iizuka | ....................... | 180/19.1 |
| 4,340,236 A | * | 7/1982 | Seibold et al. | ................ | 280/38 |
| 4,961,593 A | * | 10/1990 | Sanders et al. | ............. | 280/646 |
| 5,048,856 A | * | 9/1991 | Sanders et al. | ............. | 280/646 |
| 5,857,684 A | * | 1/1999 | Liao et al. | .................... | 280/40 |
| 6,152,465 A | * | 11/2000 | Shieh | .......................... | 280/62 |
| 6,283,238 B1 | * | 9/2001 | Royer et al. | ............... | 180/19.1 |
| 6,345,836 B1 | * | 2/2002 | Wu | ........................... | 280/651 |
| 6,695,324 B1 | * | 2/2004 | Wu | ....................... | 280/47.315 |
| 6,715,785 B2 | * | 4/2004 | Shieh | ......................... | 280/651 |
| 2003/0132613 A1 | * | 7/2003 | Lin | ............................ | 280/651 |

* cited by examiner

Primary Examiner—Christopher P. Ellis
Assistant Examiner—J. Allen Shriver
(74) Attorney, Agent, or Firm—Rosenberg, Klein & Lee

(57) ABSTRACT

An adjustment mechanism is provided to a handle of a foldable golf cart; the adjustment mechanism includes a movable member secured to two lateral rod parts of the handle, and a stationary member secured to main support rods of the golf cart; the movable member will be secured to the stationary member for holding the handle in an in-use position when the golf cart is stretched; the movable member can be adjusted in orientation relative to the stationary member to change position of the handle to suit different users.

1 Claim, 6 Drawing Sheets

ADJUSTMENT MECHANISM FOR A HANDLE OF A FOLDING GOLF CART

BACKGROUND OF THE INVENTION

1. Field of the Invention

The present invention relates to an adjustment mechanism for a handle of a foldable golf cart, more particularly one, with which the handle can be easily adjusted in position to suit various different users when the golf cart is stretched, and which allows the handle to be pivoted close to the main support rod so that the height of the golf cart can be further reduced when the golf cart is folded.

2. Brief Description of the Prior Art

Folding golf carts are convenient to use because they can be reduced to smaller size for easy storage and transportation while handles of most folding golf carts can be pivoted close to main support rods of the golf carts so that the height of the golf carts can be further reduced when the golf carts are folded. However, a conventional golf cart handle can only be secured in a single in-use position, and can't be adjusted in position to suit various different users when the golf cart is in the stretched position.

SUMMARY OF THE INVENTION

It is a main object of the present invention to provide an adjustment mechanism for a handle of a foldable golf cart, with which the handle can be easily adjusted in position when the golf cart is in the stretched in-use position.

The adjustment mechanism of a handle of a foldable golf cart of the present invention includes a movable member secured to two lateral rod parts of the handle, and a stationary member secured to main support rods of the golf cart. The movable member is equipped with both a control block normally biased upwards by an elastic element and a spring-equipped engaging element, which is normally stretched by the spring, and will be compressed when the control block is pressed down. The engaging element of the movable member will be engaged with engaging cavities of the stationary member for holding the handle in an in-use position when the golf cart is stretched. The engaging element can be engaged with selected ones of the engaging cavities of the stationary member therefore position of the handle can be changed.

BRIEF DESCRIPTION OF THE DRAWINGS

This invention will be better understood by referring to the accompanying drawings, wherein.

DETAILED DESCRIPTION OF THE PREFERRED EMBODIMENTS

Figure 1:
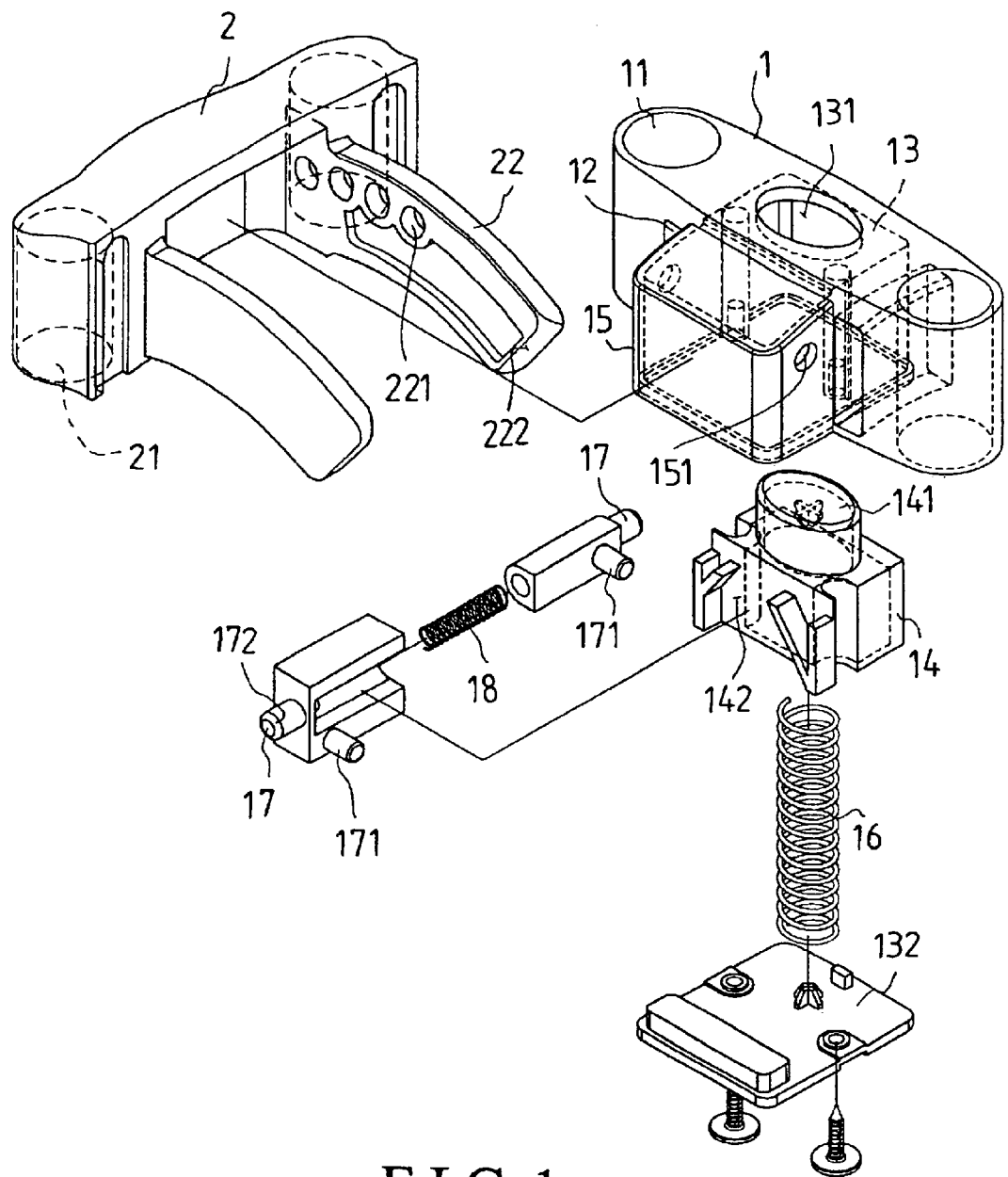
FIG. 1 is an exploded perspective view of the adjustment mechanism for a handle of a foldable golf cart according to the present invention.
Figure 2:
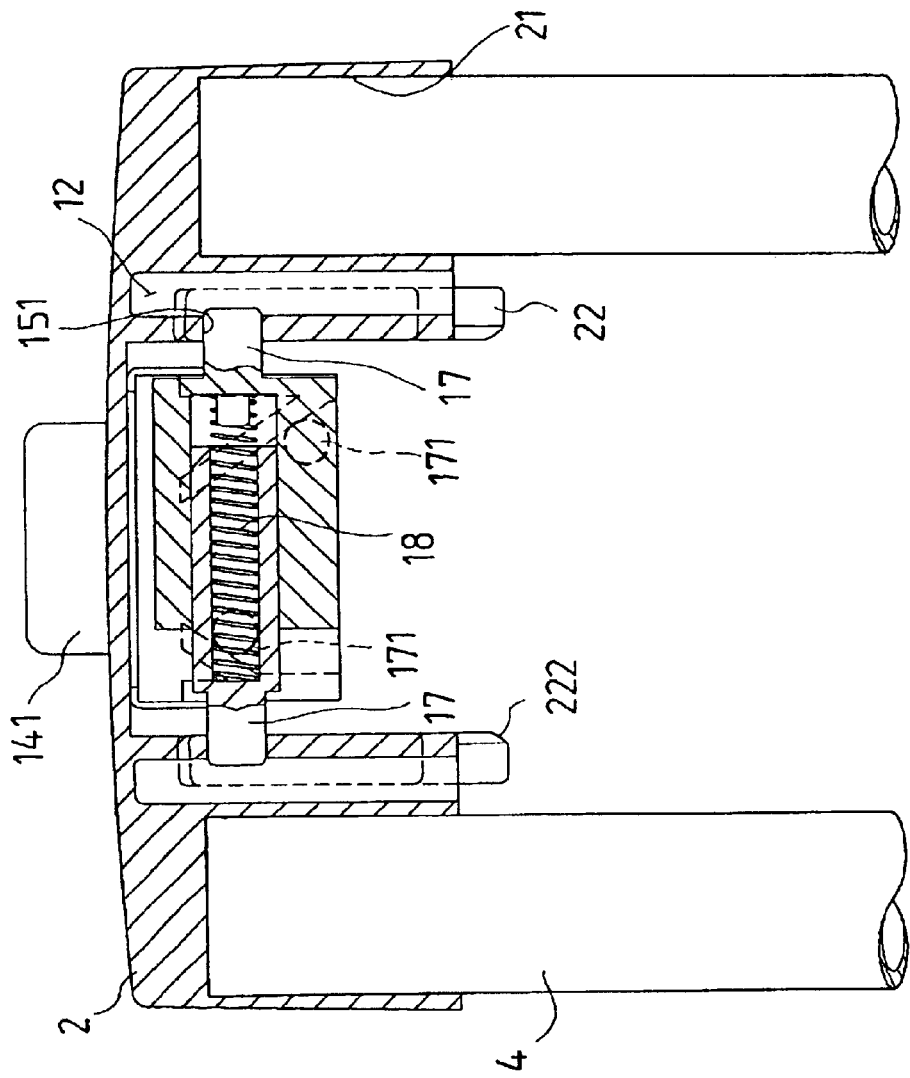
FIG. 2 is a partial vertical section of the adjustment mechanism for a handle of a foldable golf cart according to the present invention.
Figure 3:
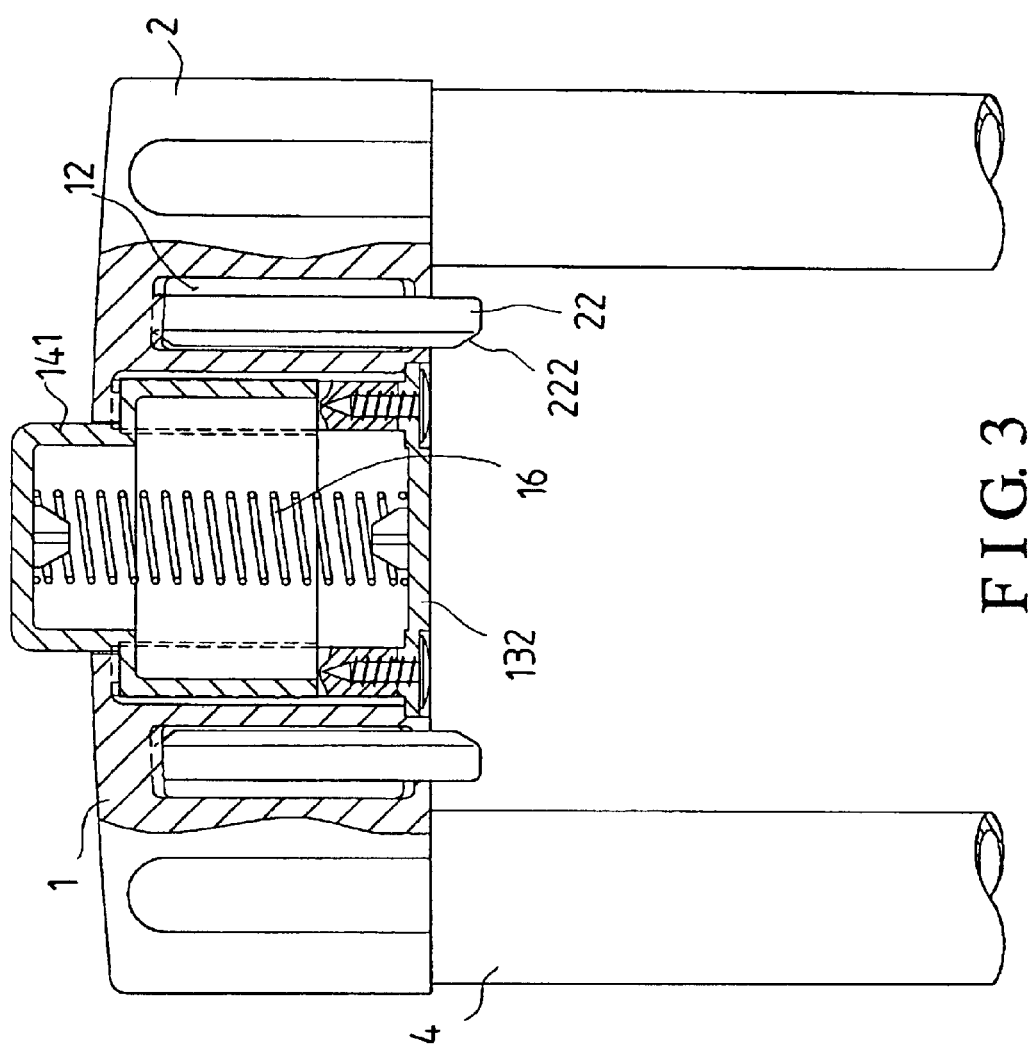
FIG. 3 is another partial vertical section of the adjustment mechanism of the present invention.
Figure 6:
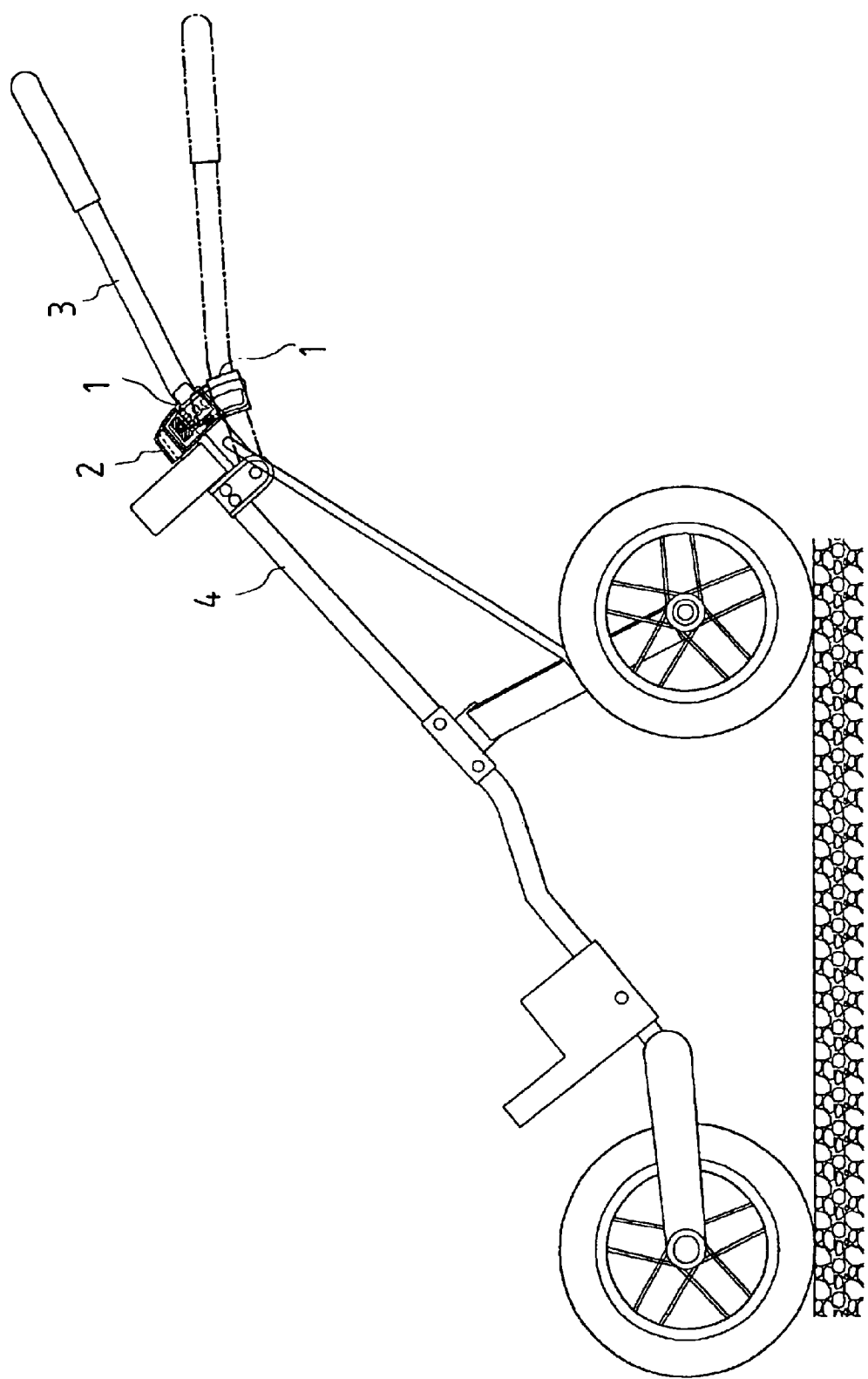
FIG. 6 is a side view of the golf cart with the adjustment mechanism of the present invention, in the stretched position.

Referring to FIGS. 1, and 6, a preferred embodiment of an adjustment mechanism for a handle of a foldable golf cart includes a movable member 1, and a stationary member 2.

The movable member 1 is secured to a handle 3 of the golf cart. The movable member 1 has two fitting holes 11, 11 on left and right portions thereof, a hollow protruding portion 15 projecting from a middle of a front side, a holding room 13 in the middle and communicating with an inside of the hollow protruding portion 15, two slots 12, 12 next to left and right ends of the holding room 13 and extending from the front side to the rear side thereof, a through hole 131 formed on a middle of an upper side to communicate with the holding room 13, and a bottom cover 132 for covering bottom openings (not numbered) of both the holding room 13 and the hollow protruding portion 15. The hollow protruding portion 15 has two opposing holes 151, 151 on left and right walls thereof.

Furthermore, the movable member 1 has a control block 14 received in the holding room 13. The control block 14 has a depressed portion 141 on a top, and a guide trench 142 on a front side thereof. The guide trench 142 is defined by left and right sloping edges so that it tapers off towards the upper end. The control block 14 is up and down movably received in the holding room 13 with the depressed portion 141 passing through the through hole 131, and with the guide trench 142 facing forwards. The control block 14 is further biased upwards by an elastic element 16, which is disposed between the bottom cover 132 and the control block 14.

The hollow protruding portion 15 of the movable member 1 has an engaging element received therein and passing through the through holes 151 of the lateral walls thereof, which engaging element includes two engaging parts, and an elastic element 18; each engaging part has an engaging projection 17, and a pushed projecting portion 171. The elastic element 18 is connected with both of the engaging parts to stretch the engaging element by means of biasing the engaging parts towards opposite directions. The engaging projections 17 pass through respective through holes 151 to stick out from the hollow protruding portion 15, and the pushed projecting portions 171 pass into the guide trench 142 of the control block 14. Therefore, the engaging projections 17 normally stick out from the hollow protruding portion 15 while the sloping edges of the guide trench 142 will push the pushed projecting portions 171 of the engaging element towards each other to compress the engaging element in case the control block 14 is pressed down, thus making the engaging projections 17 to retreat from the outer sides of the hollow protruding portion 15.

The stationary member 2 is secured to main support rods 4 of the golf cart. The stationary member 2 has two fitting holes 21, 21 at left and right ends thereof, and two opposing curved guide bars 22 projecting rearwards from a rear side thereof. There are several pairs of opposing cavities 221 formed on inward sides of the curved guide bars 22, and there are sloping surfaces 222 formed on rear ends of the curved guide bars 22. The cavities 221 are provided for the engaging projections 17 of the movable member 1 to selectively engage to secure the movable member 1 in position.

Figure 4:
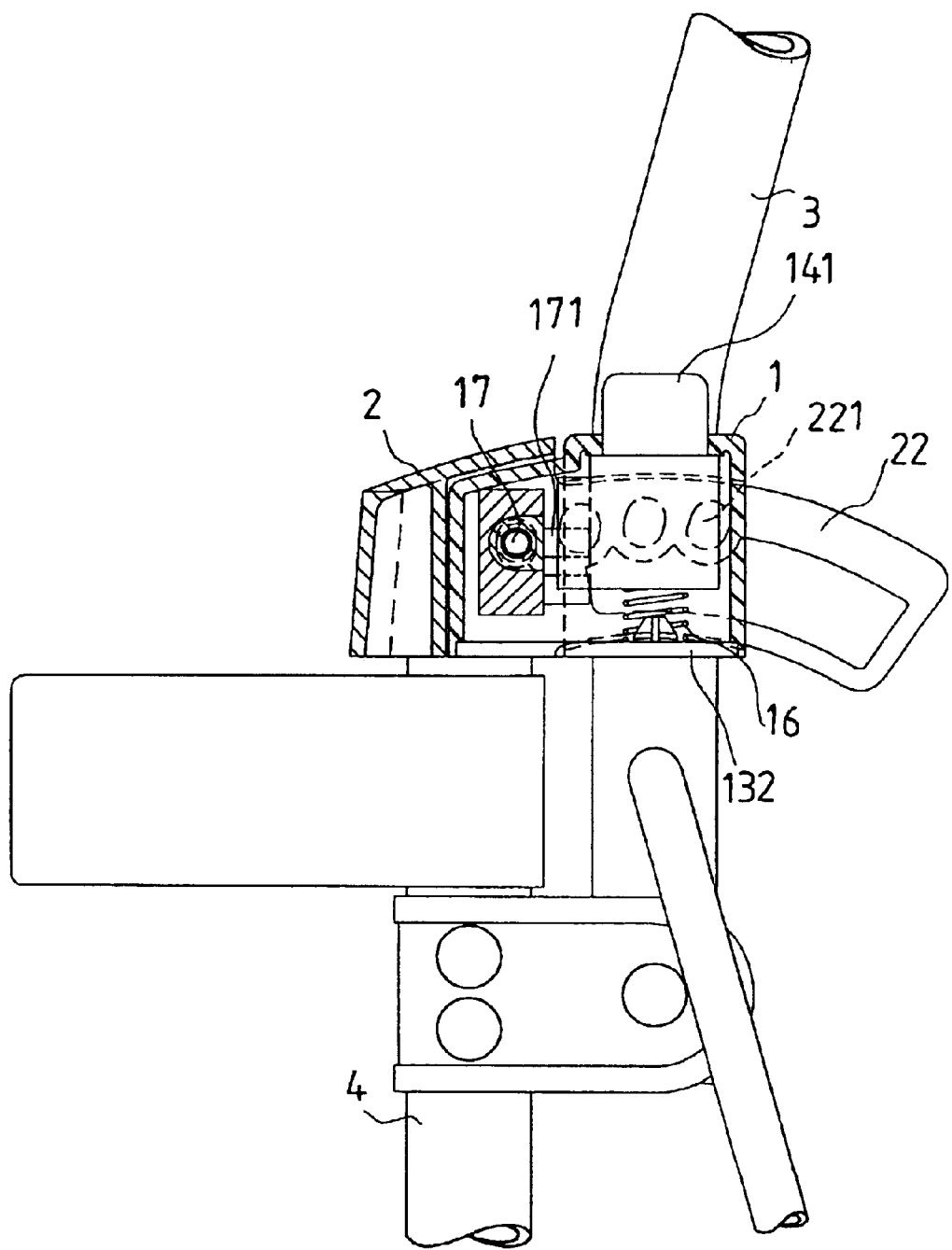
FIG. 4 is a vertical section of the adjustment mechanism of the present invention.
Figure 5:
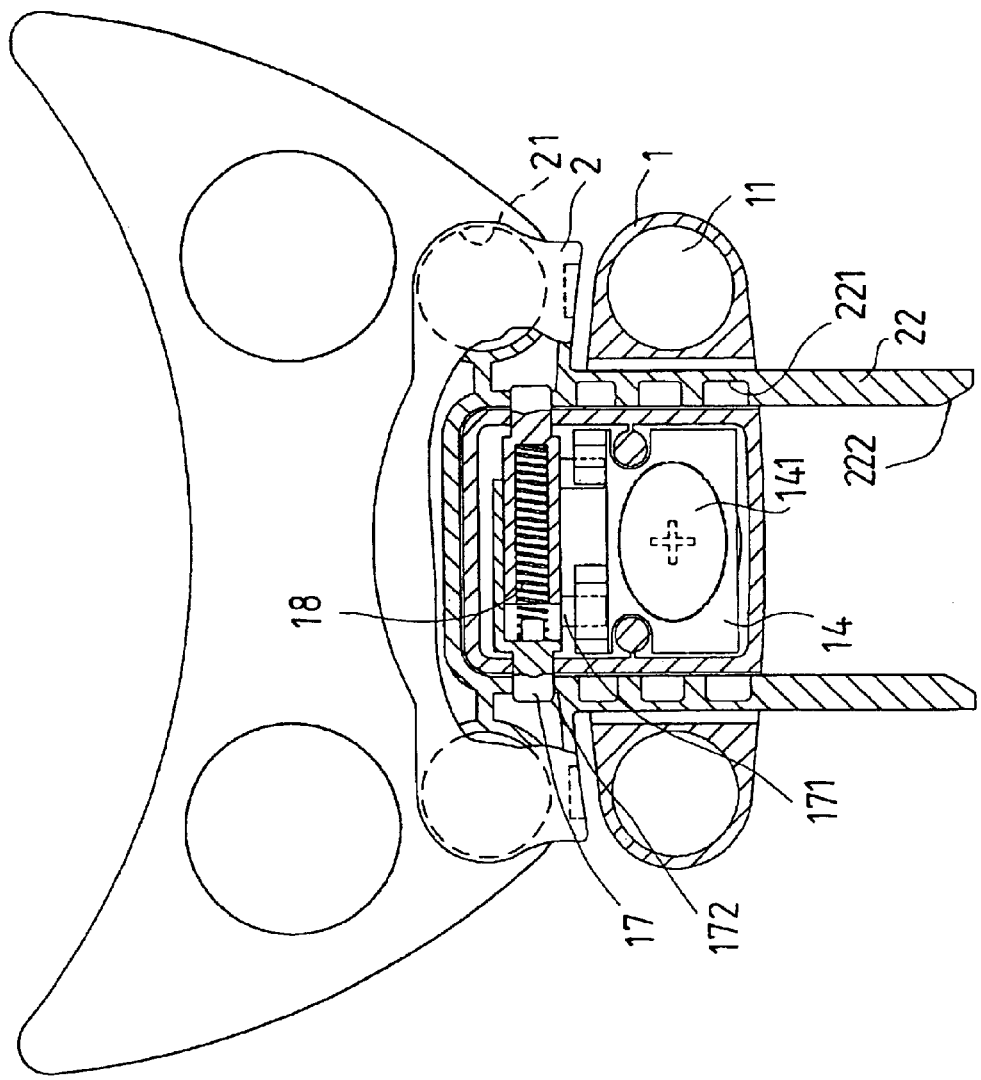
FIG. 5 is a horizontal section of the adjustment mechanism of the present invention.

In assembling the golf cart, referring to FIGS. 4 to 6, two lateral rods of the handle 3 is inserted in, and fixed to the fitting holes 11 of the movable member 1, and two main support rods 4 are inserted in, and fixed to the fitting holes 21 of the stationary member 2 while lower ends of the handle lateral rods are pivoted to a connecting block (not numbered) secured to the main support rods 4; thus, during stretching operation of the golf cart, the slots 12, 12 will pass respective curved guide bars 22, 22; the engaging projections 17 will be made to retreat by the sloping surfaces 222 of the curved guide bars 22 when the annular slopes 172 thereof come into contact with the sloping surfaces 222 during the course of the upward movement of the movable member 1. Therefore, the user doesn't have to press down the control block 14 for allowing the movable member 1 to be coupled to the stationary member 2 in stretching the golf cart, but the has to press down the control block 14 to disengage the engaging projections 17 from the engaging cavities 221 before adjusting the handle 3.

From the above description, it can be easily understood that the golf cart handle can be easily adjusted in position to suit various different users by means of the adjustment mechanism of the present invention. And, in stretching the golf cart, the movable member 1 can be easily coupled to the stationary member 2 without using the control block 14 owing to the annular slopes 172 and the sloping surfaces 222.

What is claimed is:

1. An adjustment mechanism for a handle of a foldable golf cart, comprising a movable member secured to a displaceable handle of a golf cart with two lateral rod parts of the handle tightly passing through fitting holes of left and right ends of the movable member; the movable member having a middle room, and a hollow protruding portion projecting from a middle of a front side thereof and communicating with the middle room; the movable member having two slots next to left and right ends of the middle room and extending from the front side to a rear side thereof; the movable member having a middle through hole communicating with the middle room on an upper side thereof; the hollow protruding portion having opposing through holes on two lateral walls thereof; the movable member having a bottom cover for covering lower openings of the middle room and the hollow protruding portion;

a control block up and down movably received in the middle room; the control block being biased upwards to stick out from the middle through hole of the movable member at a depressed portion by an elastic element; the control block having a guide trench on a front side thereof; the guide trench being defined by left and right sloping edges so as to taper off towards an upper end thereof;

a spring-equipped engaging element received in the hollow protruding portion, and supported on the lateral through holes of the hollow protruding portion at engaging projections of two ends thereof; the spring of the engaging element biasing the engaging projections towards opposite directions to stretch the engaging element for the engaging projections to stick out from the lateral walls of the hollow protruding portion; the engaging projections having annular slopes on outward ends thereof; the engaging element having two pushed projecting portions connected with respective ones of the engaging projections; the pushed projecting portions passing into the guide trench of the control block such that the sloping edges of the guide trench will push the pushed projecting portions of the engaging element towards each other to compress the engaging element in case the control block is pressed down, thus making the engaging projections to retreat from outer sides of the lateral walls of the hollow protruding portion; and a stationary member secured to main support rods of the golf cart with two main support rods of the golf cart tightly passing through fitting holes of left and right ends of the stationary member; the stationary member having two opposing curved guide bars projecting rearwards from a rear side thereof and capable of passing through respective ones of the slots of the movable member when the golf cart is stretched; the curved guide bars having a plurality of cavities along inward sides thereof for allowing the engaging projections on the hollow protruding portion of the movable member to selectively engage; the curved guide bars having sloping surfaces on rear ends thereof so that the engaging element can be compressed on coming contact with the sloping surfaces at the annular slopes thereof during a stretching movement of the golf cart.

* * * * *